United States Patent

Wrenbeck et al.

Patent Number: 5,436,539
Date of Patent: Jul. 25, 1995

[54] ADAPTIVE WINDOW LIFT CONTROL WITH PINCH FORCE BASED ON OBJECT RIGIDITY AND WINDOW POSITION

[75] Inventors: Bruce R. Wrenbeck, Dearborn; Jeffrey T. Kelley, Plymouth, both of Mich.; Pedro A. Perez, Tarragona, Spain

[73] Assignee: United Technologies Automotive, Inc., Dearborn, Mich.

[21] Appl. No.: 113,295

[22] Filed: Aug. 30, 1993

[51] Int. Cl.$^6$ .............................................. H02P 3/00
[52] U.S. Cl. .................................. 318/265; 318/467; 49/28
[58] Field of Search .................. 318/280–286, 318/466–470, 602, 603, 616–618, 265, 266, 272, 277; 49/26, 28, 141; 160/291, 292, 293.1, 310

[56] References Cited

U.S. PATENT DOCUMENTS

| | | | |
|---|---|---|---|
| 4,347,465 | 8/1982 | Goertler et al. | 318/266 |
| 4,641,067 | 2/1987 | Iizawa et al. | 318/286 X |
| 4,746,845 | 5/1988 | Mizuta et al. | 318/286 |
| 4,831,509 | 5/1989 | Jones et al. | 49/28 X |
| 4,918,998 | 4/1990 | Periou | |
| 4,952,854 | 8/1990 | Periou | |
| 4,994,724 | 2/1991 | Hsu | 318/283 X |
| 5,038,087 | 8/1991 | Archer et al. | 318/466 X |
| 5,069,000 | 12/1991 | Zuckerman | 49/28 |
| 5,128,597 | 7/1992 | Kokubu | 318/468 X |
| 5,218,282 | 6/1993 | Duhame | 318/466 X |

FOREIGN PATENT DOCUMENTS 9110800 7/1991 Germany.

Primary Examiner—Jonathan Wysocki
Attorney, Agent, or Firm—Robert E. Greenstien

[57] ABSTRACT

A power window system employs a computer based control that receives signals from a window position sensor. As the window moves, the position sensor produces periodic signals as an output. The computer cyclically looks for a change in the frequency of the signals as an indication that the window is obstructed and decelerating. Based on the instantaneous deceleration, the computer recalls a stored value for motor force. The recalled forces are accumulated in synchronism with the position sensor output during the deceleration, manifesting the force applied to the obstruction as the window presses on it. The window is reversed when the accumulated force exceeds a stored value. The uppermost window position is a stored value for the position sensor output obtained when the window is closed for the first time. Each time the window is closed thereafter, an offset is added to that value, the sum defining the point at which the window engages the window seal. The offset is the change in the position sensor output signal as the window is slowed by the seal until the motor stops when a stored value of force is applied to the seal.

8 Claims, 2 Drawing Sheets

ADAPTIVE WINDOW LIFT CONTROL WITH PINCH FORCE BASED ON OBJECT RIGIDITY AND WINDOW POSITION

TECHNICAL FIELD

This invention relates to window lift (power windows) used in automobiles.

BACKGROUND OF THE INVENTION

Power windows, once available on only expensive automobiles or as an expensive option on some automobiles, have become extremely popular. Advances in motor design partly explain their popularity. Smaller motor designs have made it possible to install a compact, inexpensive motor and window gear system, known as the "regulator", into the small narrow door found on many smaller automobiles. Greater consumer affluence may also be a contibuting factor to the popularity of power windows. But even so, the cost for power windows as a percentage of total vehicle cost has become relatively insignificant compared to what is was ten or twenty years ago, so much so, that manufacturers often include power windows in standard power option packages on relatively inexpensive automobiles.

The typical power window moves the window smoothly and rapidly compared to the "old" crank handle. The typical power window system is designed so that a button must be pressed while the window operates, a safety arrangement intended to reduce reaction time when stopping window movement if limb lies in the window's path as it closes. In a seeming clash of goals, the force exerted by the window must be sufficient to overcome ice and adequately compress the window seal, but the window drive should be incapable of exerting damaging pressure on a limb caught between the moving window and the seal. Some systems, addressing this problem, monitor motor current: sensing an overcurrent condition due to a high load the motor is reversed. This approach does not provide precise window motion control.

Over time, window frame and seal (gasket) geometries can change, producing air leaks between the window and the seal. Driving the window hard against the seal can compensate for that but also increases the force applied to objects in the window's path.

DISCLOSURE OF THE INVENTION

An object of the present invention is to provide a more sensitive, adaptive window lift, or power window system, in particular one that allows for "unmonitored" window closure; that is, the window control button does not have to be depressed continuously to fully close the window and compress the seal, but the window will automatically reverse when an obstruction is encountered.

According to the invention, a power window system is computer controlled in such a way that window travel is measured as a count and, when the power window is first operated, the upper and lower limits of window travel are stored permanently as a base counts. The base count is augmented during successive operations of the window based on differences between counts derived on successive window closures and the base count.

According to the invention, the range of window movement is stored as a count, a count value of zero being the top of the window. A certain count determined by the computer to be greater than zero represents the "pinch zone", the point at which the window first contacts the window seal or seal.

According to one aspect of the invention, the location of the seal is determined from the window location (count) when the window starts to decelerate from the seal's resistance.

According to another object of the invention, when the window engages an object below the seal the count rate decreases, and the derivative of the count (rate of change in count relative to time) is used as indication of deceleration, also indicating the object's rigidity. (A hard object causes a greater rate of change than a soft object.) The deceleration is used to recall a stored value for motor force associated with the instantaneous deceleration. The force for each count is computed, and from that force, as the motor slows, the count is accumulated, the sum of an accumulation of force applied to the object. If the force meets certain criteria, based on the location of the window, the window is stopped and reversed. A rigid object will produce a high deceleration, high force per count and therefore little window movement will take place before the window is stopped. A soft object produces a low deceleration and a lower force per count, and therefore more window movement will take place before the window is stopped and reversed.

According to one aspect of the invention, the window location count associated with the lower limit of the seal is used to determine if window reversal should take place or the window should close normally, the presence of an object creating an offset between the top of the window and the bottom of the seal in what is called the "pinch zone".

According to the invention, the count is reset to zero when the window is fully closed, compensating for changes in window frame and seal dimensions and geometry.

A feature of the invention is that it distinguishes between different objects and tailors window stoppage and reversal accordingly.

Another feature, a system embodying the present is "smart", capable of adapting to changing window geometries, for instance changes in seal thickness or window travel length.

Other objects, benefits and features of the invention will be apparent to one skilled in the art from the following description and drawings.

BEST MODE FOR CARRYING OUT THE INVENTION

Figure 1:
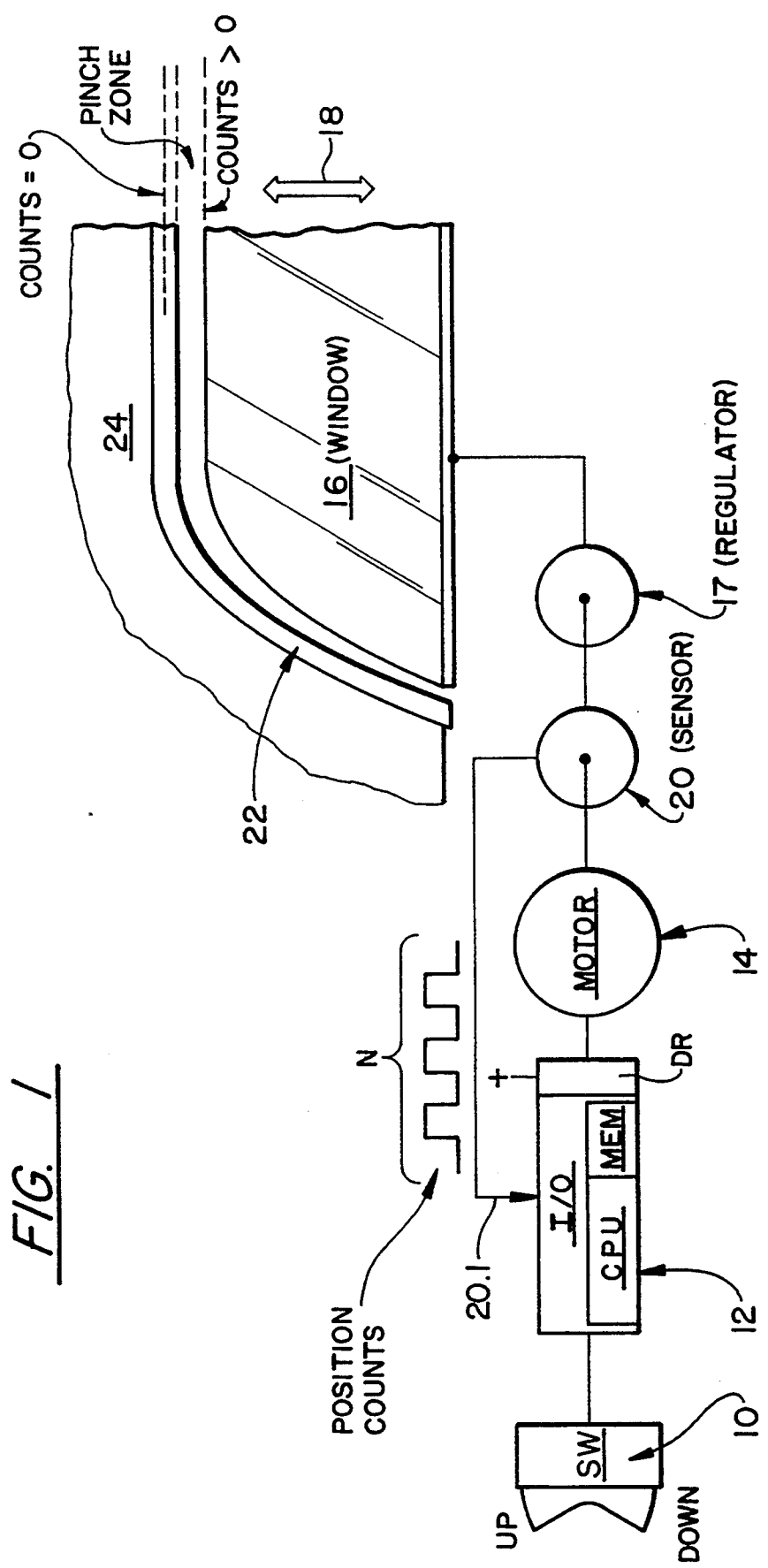
FIG. 1 is a simplified block diagram of a window lift (power window) system embodying the present invention.

In FIG. 1, a rocker switch 10 is connected to a motor control 12 and controls the speed and direction of rotation of a DC motor 14. The switch has two positions, window UP and DOWN. If the switch is held in either position for more than a set time interval, the motor control responds as if the switch is held continuously in that position. Alternatively, the switch may be provided with a detent pair of terminals (in addition to momentary or "press to power" terminals) to make a connection to the control indicating that window should travel fully up or down after the switch is released. In some automobiles this is called "automatic" operation, a term meaning that the window will automatically travel fully down when the switch is pushed the automatic position and released. A significant point, the present invention provides automatic operation for up and down window travel by using a signal processing scheme capable of distinguishing between an object in the window's path and the window seal.

The motor is connected to a typical vehicle window 16 by a "regulator", the conventional window support and crank by which the motor rotation is translated in vertical window movement, shown by arrow 18. It is assumed that the motor is coupled to the regulator through appropriate gearing of some sort, or even perhaps by a linear plastic gear, often used in seat belt retractors. The mode of mechanical connection between the motor and the window is not relevant to the invention, which focuses on a scheme by which the control adjusts motor speed and direction based on window movement. That movement is sensed by a position sensor or transducer 20 that produces pulses (e.g. the N quadrature pulses shown in FIG. 1) at a frequency that manifests motor speed and direction. Those pulses define the POSITION COUNTS signal on the line 20.1. If the motor is of the permanent magnet type, this sensor may consist of two Hall effect sensors (ideally 90 degrees apart) located around a ring magnet mounted directly on the motor shaft. The magnet and sensors may be located inside the motor 14. Every rotation of the motor produces a fixed number of pulses on the line 20.1. The sensor 20 has two lines 20.1 so that the phase relationship between he pulses can be used to determine motor direction. For purposes of simplicity, that capability, which is known in the art, is assumed in this discussion of the invention. The quadrature waveform of a POSITION COUNTS signal shown in FIG. 1 is intended to illustrate that the sensor will provide pulses from which a count can be obtained (by counting up and down) indicating motion of the motor and thereby the movement and location of the window 16. While this approach favors the use of a simple pulse producing position sensor for relative position sensing, more complex absolute position encoders may be used to derive window position and motor speed and direction for use in a system embodying the invention.

In FIG. 1, the "pinch" zone defines the final window movement in the up direction before the window reaches the gasket or seal 22 on the vehicle's window frame 24, which is partially shown. The signal line 20.1 carries the POSITION COUNTS signal (pulses) to a central processing unit CPU, a signal processing device such as microprocessor or state machine capable of using the POSITION COUNTS signal to determine motor speed and direction and window location based on data stored in a memory unit MEM (such as an EEPROM) along with signal processing instructions generally described below in the flow chart that forms FIG. 2. Incapable of controlling high currents and voltages, the CPU produces output signals that are supplied to a motor driver DR, a conventional power driver (therefore not shown in detail) that varies current between a positive supply and ground through the motor 14 based on commands from the CPU to control the motor's speed and direction. The CPU, it must be seen, as an interface between the switch 10 and the driver. The switch only indicates to the CPU a command to move the window up or down. If and how that is done depends upon decisions made by the CPU. As noted previously, it is assumed that the instructions for the CPU provide the capability for momentary and continuous motor operation (until the window reaches the upper or lower limits of its travel) depending upon how long the switch 10 is pressed. It is known, of course, that the control 12 would include input/output devices to couple signals between the CPU and the shown external devices, and so, for simplicity, these I/O devices have been omitted, having no relationship to the invention.

One aspect of the operation of this system is the "initialization" process, which takes place the first time the window lift is operated, for instance, just after vehicle assembly. At that point, the MEM has no information on the upper and lower limits of window travel as defined by value stored in MEM hereafter called COUNTS. For any window location there is a specific COUNTS value based on the number of pulses in the POSITION COUNTS signal to reach that location from an initial position, when the window is fully closed, where the COUNTS value for that location is zero. The window is run from its full open to full closed position, where it compresses the seal. At that location, the CPU stores a value of zero for the COUNTS for that position. Thereafter, the count will increase as the window opens, the maximum value for COUNTS occurring when the window is fully opened. The difference between the two values can be considered a "base count", a measure of window travel maintained in the MEM and incremented or decremented each time the window closes during normal operation by adjusting the value for the window top position (stored as zero) with a value (an offset) determined from the POSITION COUNTS signal when-the window actually stops. This adaptive capability, which compensates for changes in seal size over time, is provided by some of the steps in the sequence in FIG. 2.

Figure 2:
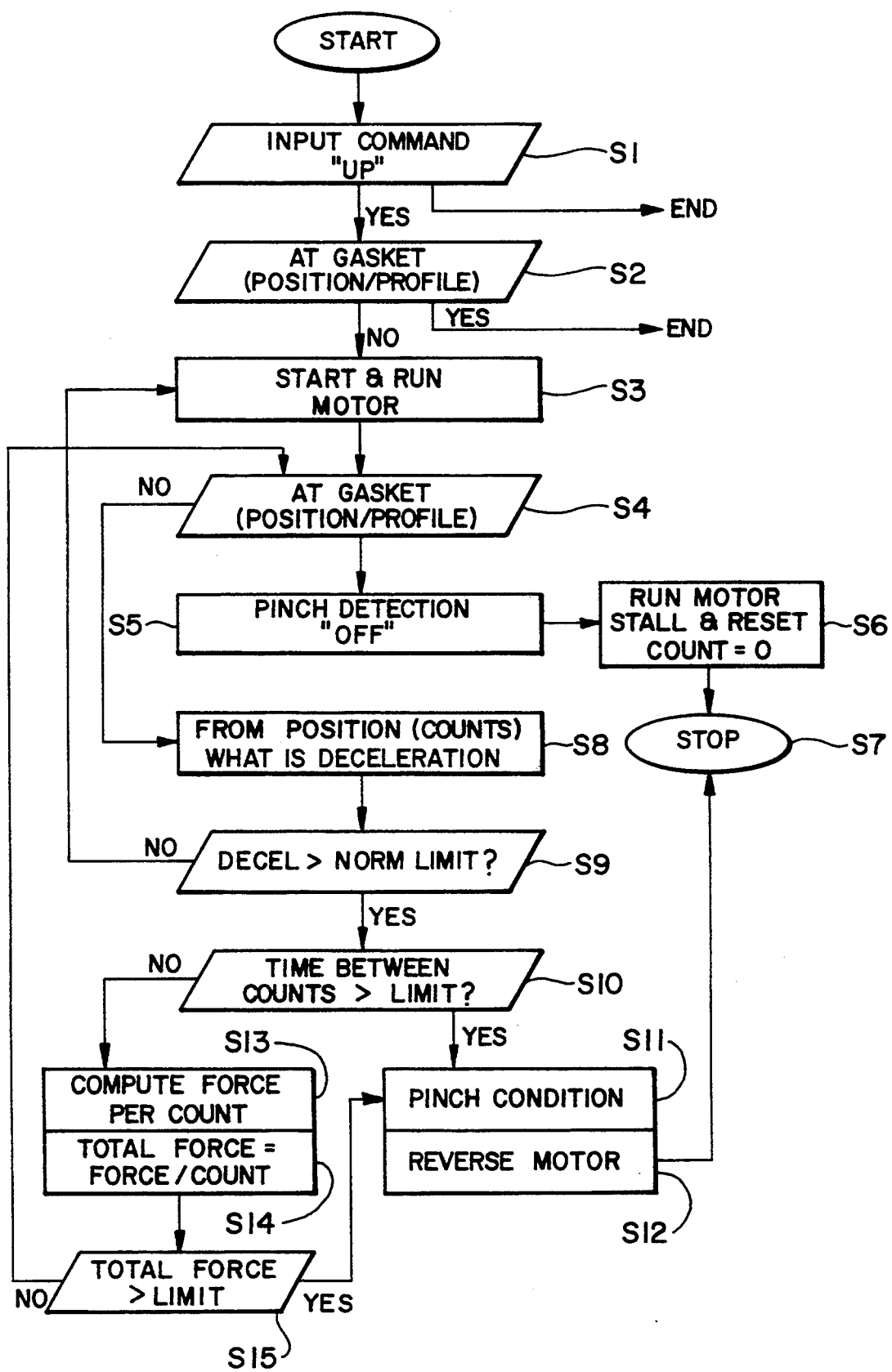
FIG. 2 is a flow chart showing signal processing steps according to the present invention.

Referring to FIG. 2, step S1 is a CPU query that determines if the window button 10 has been depressed to command "UP" window movement. For the purposes of this discussion, it should be assumed that operation of the button is taken by the CPU to mean that the window should automatically close, a performance mode different from simply commanding window closure for only so long as the button is operated, which may be considered operator controlled window closure. The assumption is that step S1 yields an affirmative answer, which will prompt the CPU to start the motor in step S3, depending upon the answer to a test made at step S2. Step S2 tests to see if the window is against the seal; if it fully closed based on the window position manifested by the accumulated value of the COUNTS signal (from a previous window operation stored in the MEM). The discussion assumes a negative answer at step S1, meaning the window is below the seal, for instance half opened, and that the instantaneous value of the COUNTS signal is greater than zero by an amount exceeding the dimension of the seal 22 (See FIG. 1). At step S3, the motor is energized by the CPU, causing the window 16 to rise and approach the seal. During this time, the CPU continues to compare the window's position, manifested by the COUNTS, with the stored value for COUNTS for the top of the window travel, producing an affirmative or negative answer at step S4 depending up window position. An affirmative answer means that the window is at the seal with the COUNT value slightly greater than zero reflecting the fact the seal has not been compressed by full window closure, and the affirmative answer commands an OFF state for a pinch detection flag. This means that the window is against the seal and an object is not between the seal and the window, a condition determined from test steps that follow and that are part of the automatic operation characteristic of the present invention. When the pinch detection flag is set to OFF at step S5, the motor continues to run until it stalls against the seal resistance; then the value for COUNTS is set to zero (COUNTS=0 in FIG. 1) at step S6 and the motor is stopped at step S7. If the test made at step S4 produces an affirmative answer, the CPU determines from the COUNTS signal (it is decrementing to zero as the window closes) the rate of change in the COUNTS. The time between pulses in the POSITION COUNTS signal increases when the window slows, indicating deceleration, presumably from an object or friction. This measurement of deceleration is made at step S8, leading to step S9, which tests if the deceleration exceeds a stored normal limit (NORM). If not, the sequence returns to step S3, allowing the window to close while the tests are again run to see if an object is in the window's path as it closes. Assume an affirmative answer at step S9. Step S10 determines if the time elapsed between count pulse exceeds a stored limit. An affirmative answer, means that a pinch condition exists, setting the pinch detection flag at step S11, prompting motor reversal at step S12 with the motor stopping at step S7 at some lower position, relieving the pinch condition. A negative response at step S10 leads to step S13. Here the force per count (i.e. at that instant) is computed based on stored values for motor force versus motor deceleration. Following that computation (using the force versus deceleration values stored in MEM), the total force is calculated at step S14 by summing the recalled force at that instant with the sum of the previously instantaneous forces recalled following the the negative answer at step S10. In effect, this is a runing total of the force. The force for each count (new position) may change each time the test is run (as the window slows) if the rate of deceleration changes. That change will cause the CPU to recall a different force at that instant and add it to the previous total. If the deceleration is constant the same force will be used as the count changes. In this way, the total force applied to an object in the window's path is accumulated as the window presses against it, the rate of change in the total force depending upon the object's resilience or stiffness. Step S15 then asks if the total force has exceeded a stored limit. A negative answer means that the window can continue to close, but the sequence returns to step S4 to continue to distinguish, as before, between a pinch condition and normal window pressure against the seal (an affirmative answer at step S4). Step S11, where the pinch detection flag is set causing window reversal, is also accessed by an affirmative answer at step S15, meaning that too much force has been applied to the object. As before, this produces window reversal, releasing the force on the object.

With the benefit of the foregoing description and explanation of the invention, one skilled in the art may be able to modify all or part this best mode for carrying out the invention without departing from the true scope and spirit of the invention that it embodies.

We claim:

1. A window lift system for closing a window against a seal comprising a motor, means for coupling the motor to a window, and a switch for commanding motor operation, characterized by:

a position sensor providing a location signal indicating window movement;

signal processing means responsive to the operation of the switch to provide a signal to operate the motor comprising means for receiving the location signal; for storing a first value of the location signal indicating the lowest point of window location and a second value for the location signal indicating the highest point of window location; for providing a deceleration signal from the location signal indicating the rate of change over time for said location signal as the window moves; for recalling a first stored value of motor force for the magnitude of the deceleration signal at a first time; for recalling a second stored value of motor force for the magnitude of deceleration at a second successive time interval, for adding said first and second values of motor force; for stopping the motor if the sum exceeds a stored value when the location signal indicates that the window is no higher than a first stored height and stopping the motor when the force applied by the motor exceeds a second stored value if the location signal indicates that the window is above the first height and is less than the second value, the first height being the sum of the second value and an offset value; for storing the count when the motor is stopped; and for storing the offset value each time the window closes against the seal by sensing the change in the location signal between the time the motor starts to decelerate and stop on the seal.

2. The invention described in claim 1, further characterized in that:

the signal processing means comprises means for stopping and reversing the motor when the deceleration of the window exceeds a stored limit and the time between changes in the location signal exceeds a stored limit.

3. A window lift system for closing a window against a seal comprising a motor, means for coupling the motor to a window, and a switch for commanding motor operation, characterized by:

a position sensor for providing a location signal indicating window movement;

signal processing means comprising means responsive to the operation of the switch to provide a signal to operate the motor, and responsive to the location signal for calculating and storing, at successive intervals, distinct motor force values, applied by the window over distance, based on motor deceleration, from the time that window starts to decelerate, for providing a force signal by accumulating said motor force values and for stopping the motor when said force signal exceeds a stored value.

4. The invention described in claim 3, further characterized in that:

the signal processing means comprises means for storing a first value indicating the window location at which the window engages a window seal based on the window deceleration when engaging the seal.

5. The invention described in claim 4, further characterized in that:

the first value is the sum of an offset and a stored value indicating the uppermost window position derived from the location signal when the window is closed for the first time, the offset representing a change in the location signal from the time that the motor begins to decelerate and stops when engaging the seal.

6. The invention described in claim 5, further characterized in that:

the position sensor produces count pulses and the motor force for each count is computed and accumulated to produce a sum indicating window force.

7. The invention described in claim 6, further characterized in that:

the signal processing means comprises means for determining window deceleration from the count pulses and for stopping and reversing the motor when the time between the count pulses exceeds a stored value following a determination that window deceleration exceeds a stored value.

8. A method for installing a window lift system for closing a window against a seal comprising a motor coupled to the window, and a switch for commanding motor operation, characterized by the steps:

sensing window location with a sensor coupled to the window;

sensing motor force;

storing a value for motor force;

producing an actual motor force value by summing incremental motor force values calculated as the motor decelerates when the window engages an object operating the switch to energize the motor to move the window from its lowest to highest location;

stopping the motor when said stored value of motor force and said actual motor force value are equal;

providing window location signals from the sensor as the window moves and from the location signals storing a value for a window location when the window is at its lowest point, a value for a window location at which the motor begins to slow and a value for a position when the motor is stopped because said stored value of motor force and said actual motor force value are equal.

* * * * *

UNITED STATES PATENT AND TRADEMARK OFFICE
CERTIFICATE OF CORRECTION

PATENT NO. : 5,436,539

DATED : Jul. 25, 1995

INVENTOR(S) : Wrenbeck et al.

Page 1 of 2

It is certified that error appears in the above-identified patent and that said Letters Patent is hereby corrected as shown below:

Column 1, line 7:    "lift" should be --lifts--.

Column 1, line 19:    "contibuting" should be --contributing--.

Column 1, line 22:    "what is" should be --what it--.

Column 2, line 18:    "sum of" should be --sum being--.

Column 2, line 60:    after "switch" insert --(SW)--.

Column 3, line 5:    after "pushed" insert --to--.

Column 3, line 34:    "he" should be --the--.

Column 3, line 67:    "as" should be --is--.

Column 4, line 23:    "full open" should be --fully opened-- and "full closed" should be --fully closed--.

Column 4, line 52:    "seal; if" should be --seal gasket; that is,--.

Column 4, line 53:    after "value" insert --(the position/profile)--.

Column 4, line 66:    "up" should be --upon--.

Column 5, line 1:    after "fact" insert --that--.

Column 5, line 63:    after "part" insert --of--.

UNITED STATES PATENT AND TRADEMARK OFFICE
CERTIFICATE OF CORRECTION

PATENT NO. : 5,436,539

DATED : Jul. 25, 1995

INVENTOR(S) : Wrenbeck et al.

It is certified that error appears in the above-identified patent and that said Letters Patent is hereby corrected as shown below:

Column 6, line 19:   "interval," should be --interval;--.

Column 6, line 33:   "stop" should be --stops--.

Column 6, line 53:   after "that" insert --the--.

Column 8, line 6:    "for" should be --of--.

Signed and Sealed this

Seventh Day of November, 1995

*Attest:*

BRUCE LEHMAN

*Attesting Officer*  Commissioner of Patents and Trademarks